United States Patent Office 3,007,035
Patented Oct. 31, 1961

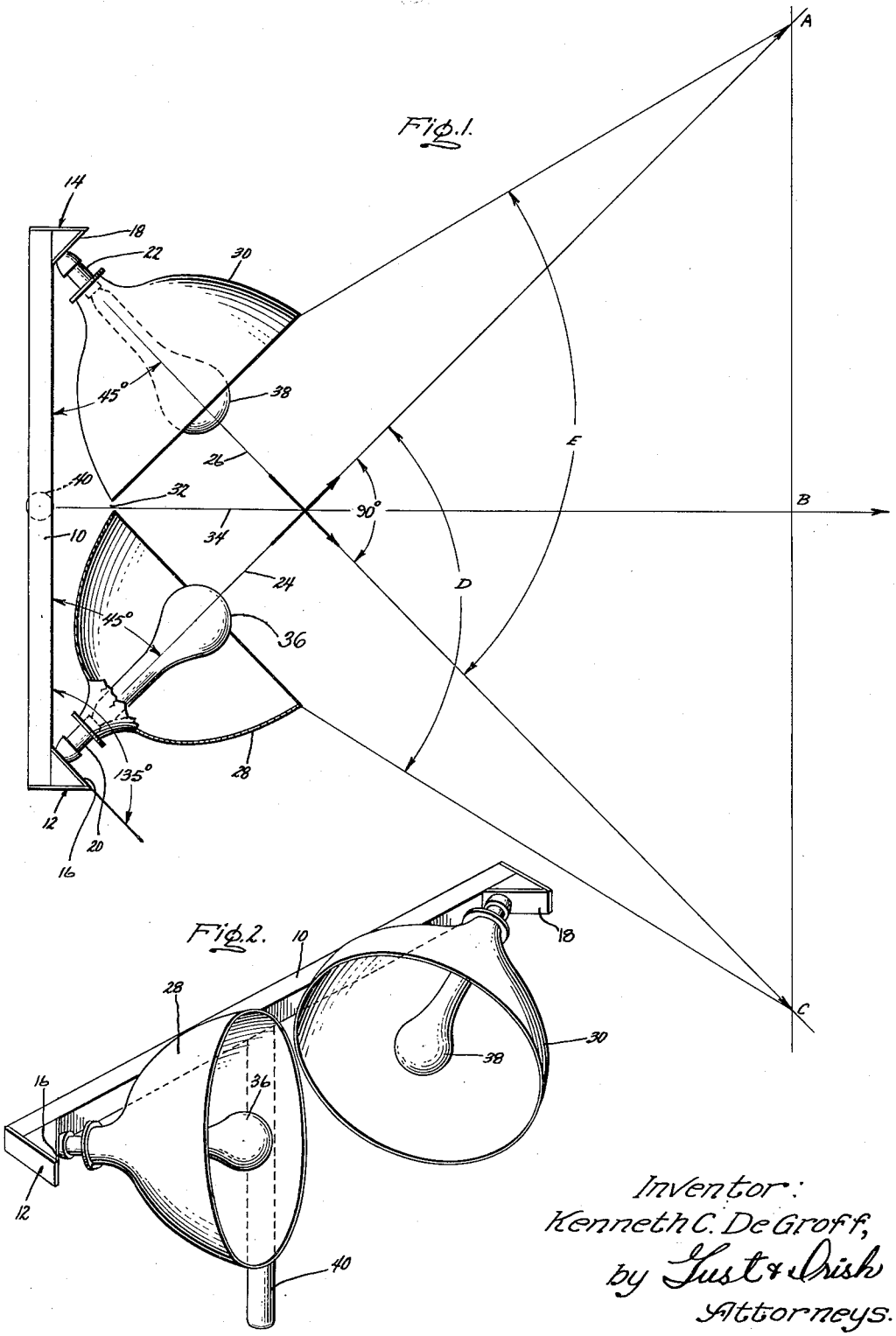

3,007,035
PHOTOGRAPHIC LIGHT SOURCE
Kenneth C. De Groff, 1920 S. Michigan St.,
South Bend, Ind.
Filed Oct. 24, 1958, Ser. No. 769,448
4 Claims. (Cl. 240—1.3)

The present invention relates to a photographic light source and more particularly to a light source capable of providing a wide, substantially uniform distribution of light over a plane surface spaced a given distance from the source.

For purposes of wide-angle photography requiring artificial lighting, many and varied types and designs of lighting equipment have been employed, such equipment being arranged to provide wide and substantially even distribution of light over the subject area. This equipment is usually relatively complex and expensive, requiring several individual light sources spaced and directed at critical locations with respect to the area to be photographed. In sharp contrast with this wide-angle lighting is the illumination resulting from an individual divergent beam source which produces highlighting in the central region of the area to be photographed and graded, lower intensity or shaded lighting in the outer regions. In wide-angle photography, this graded lighting is undesirable, inasmuch as the resulting photograph lacks definition and clarity in the outer regions. Thus, satisfactory results in wide-angle photography can only be achieved by the use of wide-angle lighting, and as explained hereinabove, such lighting is not easily and simply obtained.

It is an object of this invention to provide a wide-angle light source which is extremely simple and compact in design, fully portable and facile to use, and inexpensive in its construction and operation.

It is another object of this invention to provide a wide-angle light source which requires only two divergent beams for obtaining a substantially uniform illumination of a plane surface.

Other objects will become apparent as the description proceeds.

Utilizing the accepted laws of photometry that intensity of illumination from a point source varies inversely as the square of the distance and that illumination of a plane surface varies with the cosine of the angle of incidence, in conjunction with two uniquely arranged reflectors having light sources, the present invention is capable of achieving a wide-angle, substantially uniform illumination of a plane surface in a simple, facile and economical manner. In achieving this uniform illumination, two light sources utilizing reflectors provide divergent beams of light which cross immediately adjacent the reflectors to project the heaviest concentration of rays onto the respective lateral edges of the plane surface to be illuminated. The angle of crossing, the shape of the reflectors, and the lamps used in the reflectors may vary so long as they complement each other in providing the flat plane of illumination, as explained more fully hereinafter.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

In the drawings:

FIG. 1 is a sectional illustration of an embodiment of this invention and a graph or pattern of lighting distribution used in explaining the principles of this invention; and FIG. 2 is a front perspective illustration of the embodiment of FIG. 1.

Referring to the drawings, the photographic light source comprises an elongated, rigid bar 10 formed of sheet metal or the like. At the opposite ends of this bar 10 are provided two mounting brackets 12 and 14, respectively, which have fixedly mounted in place two flat plates 16 and 18 set in respective planes which define angles of 135° with the longitudinal extent of the bar 10. Secured to each of the two plates 16 and 18 are two conventional light sockets 20 and 22 which extend forwardly at right angles thereto. The axes of these two sockets 20 and 22 are indicated by the two lines 24 and 26, respectively, these two lines serving also as the axes for certain elements to be described more fully in the following.

Mounted on the two sockets 20 and 22 are two bowl-shaped reflectors 28 and 30, these reflectors being coaxial with the two respective axes 24 and 26. In the preferred embodiment of the invention illustrated, the peripheral edges of the two reflectors 28 and 30 are adjacent to each other in the vicinity of the numeral 31 and also adjacent the line 34 which bisects the angle formed by the two intersecting axes 24 and 26.

Two standard No. 2 photoflood lamps 36 and 38 are screwed into the two sockets 20 and 22, respectively, and may extend slightly forwardly of the front edges of the two reflectors as shown.

The handle 40 is secured to the light bar 10 at the center thereof and may provide a convenient attachment for mounting the light source on a camera or the like.

For the purpose of presenting a practical working embodiment of this invention and not intending that this working embodiment be limitative of the scope and spirit of the invention, certain dimensions are given in the following, which result in a light source capable of producing a substantially uniform distribution of light over a plane surface defined by the letters A, B and C in FIG. 1, this plane surface being perpendicular to the plane of the drawing. At one-inch intervals on each of the reflector axes extending from the respective planes of the forward perimeters of the two reflectors toward the rear or bases thereof, the diameters are substantially as follows, these diameters establishing the reflector profiles:

0 inches (a point lying in the plane
  of the reflector front edge)_____ 10 inches.
1 inch_____ 9 inches.
2 inches_____ 8 inches.
3 inches_____ 7 inches.
4 inches_____ 5 inches.
5 inches_____ 2 inches.
Lamps 36, 38_____ No. 2 standard
                                    photoflood lamps.
Distance between the mountings of
  the two sockets 20 and 22 on the
  bar 10_____ 17½ inches.

In operation, assuming that the subject area to be illuminated lies in a plane A, B, C perpendicular to the surface of the drawing, the light source is positioned with the two axes 24 and 26 in a plane normal to the plane A, B, C.

The axis 24 intersects the lateral edge of the image area at point A, the axis 26 intersects the opposite lateral edge at point C, while the line 34 which bisects the angle formed by the two axes 24 and 26 intersects the plane at point B. Obviously, moving the plane to be illuminated closer to or farther away from the light source will either widen or narrow, respectively, the area of illumination. In other words, the two axes 24 and 26 define the lateral limits of illumination between which the distribution of light over the plane is substantially uniform.

The two reflectors 28 and 30, being substantially identical, serve to concentrate the central and most intense region of the light beams emanating therefrom toward and onto the lateral edge portions A and C of the illuminated plane. These light beams are divergent, with the heaviest concentration of rays being in the central region of the beam, the outer regions having progressively fewer rays moving radially outwardly from the beam center. This being true, the light emanating from the source 28, 36, for example, is more heavily concentrated in the lateral edge region A of the illuminated plane, lower ray concentration falling on the remaining portions of the plane in the direction of the edge C. However, the source 30, 38 produces its heaviest concentration of light on the edge portion C of the illuminated plane, its ray concentration diminishing in intensity progressively toward the opposite lateral edge A. This is graphically illustrated by the angles D and E which outline the effective spans of illumination emanating from the two sources 28, 36 and 30, 38, respectively. The two rays of the angle D are shown as extending to the lateral edges of the illuminated plane. The same is true for the rays defined by the angle E, these two angles overlapping and thereby contributing to the total plane illumination. Since it is an accepted principle of photometry that intensity of illumination from a source varies inversely as the square of the distance and that illumination of a plane surface varies with the cosine of the angle of incidence, by projecting the heaviest concentration of light from two crossed sources toward the lateral edges of the plane to be illuminated, which edges are at a greater distance from the individual light sources than the plane center, it becomes evident that it is possible to obtain a flat plane of light by the use of only two sources so set with respect to each other as to provide complementary illumination, additive on the illuminated plane to provide constant brightness over the entire area thereof. This uniform brightness over the illuminated plane results not only from the use of the two crossed sources 28, 36 and 30, 38, but also by reason of the fact that light from these two sources inter-reflects between the two reflectors to fall eventually on the illuminated plane. Thus, the direct and reflected light from the two sources combine, in the final analysis, to provide the uniform plane illumination.

While two bowl-shaped reflectors have been shown, it will now be understood by persons skilled in the art that a single reflector having curvatures equivalent to those of the two reflectors 28 and 30 may be used instead, the direct and interreflected illumination between the reflector surfaces, which combine and fall on the illuminated plane, providing a wide distribution of light of substantially uniform intensity. Therefore, other equivalent configurations than the one disclosed herein may be used without departing from the spirit and scope of this invention, an example of such another equivalent configuration being a single reflector construction having substantially flat, parallel upper and lower sides and a horizontal profile or cross-section which possesses the horizontal profile curvature, or the equivalent thereof, of the two reflectors 28 and 30 shown in the drawings. Such a single reflector would still use the two light sources arranged substantially as described, the positioning of the light sources being such as to produce the desired end result of a substantially flat plane of light, as already explained.

The present invention is to be contrasted with known, wide-angle lights which use only single light sources, such wide-angle light not being satisfactory for photographic purposes inasmuch as the illumination of the area being photographed is not constant throughout its area. It would be hypothetically possible to use only a single light source in the present invention by locating such single source at the apex of a single reflector having a horizontal profile, as just described, resembling the capital letter "W"; however, in order to achieve the flat distribution of light, it would be necessary for this apex to be situated at the exact location of the source, and since this is a practical impossibility, it then becomes necessary to divide this single source into two sources which are properly located with respect to the two reflecting portions of the profile. Hence, by the use of two sources, it is possible to achieve a flat plane of light useful for photographic purposes in situations where a single source, wide-angle light fails.

What is claimed is:

1. A photographic light source comprising an elongated bar having opposite ends inturned at an angle of 135° to the longitudinal extent of said bar, two lamp sockets mounted on said inturned ends respectively to be angled toward each other, the axes of said sockets intersecting in front thereof at right angles, two bowl-shaped reflectors coaxially mounted on said sockets respectively to be angled toward each other, the proximal portions of the perimeters of said reflectors being disposed contiguous to each other and contiguous to a line bisecting the aforesaid angle of said axes, said reflectors having a curved profile measured on diameters at approximately one-inch intervals along the respective reflector axes of approximately ten inches, nine inches, eight inches, seven inches, five inches and two inches, respectively.

2. A photographic light source comprising an elongated bar having opposite ends inturned at an angle of 135° to the longitudinal extent of said bar, two lamp sockets mounted on said inturned ends respectively to be tersecting in front thereof at right angles, two bowl-shaped reflectors coaxially mounted on said sockets respectively to be angled toward each other, the proximal portions of the perimeters of said reflectors being disposed contiguous to each other and contiguous to a line bisecting the aforesaid angle of said axes, said reflectors having a curved profile measured on diameters at approximately one-inch intervals along the reflector axes of approximately ten inches, nine inches, eight inches, seven inches, five inches and two inches, respectively, and the two planes defined by the two reflector perimeters intersecting each other at substantially right angles whereby said reflectors mutually receive and reflect light from the other toward the area to be illuminated.

3. A photographic light source comprising two identical light sources fixedly positioned with respect to each other, said sources each including a bowl-shaped reflector, said reflectors being angled inwardly toward each other such that the axes thereof intersect at an angle of ninety degrees, said reflectors being symmetrical about the respective axes, the perimeters of said reflectors defining respectively two planes which intersect at right angles, each plane being perpendicular to the axis of the respective reflector, the proximal portions of the two perimeters being contiguous with each other whereby said reflectors are mutually exposed to receive and reflect light from the other toward the area to be illuminated, the profile of each reflector having a curvature according to the following relationship given in linear units of measurement: at one unit intervals along the reflector axis the reflector diameters are successively approximately ten units long, nine units long, eight units long, seven units long, five units long and two units long respectively.

4. A photographic light source comprising two identical light sources fixedly positioned with respect to each other, said sources each including a bowl-shaped reflector, said reflectors being angled inwardly toward each other such that the axes thereof intersect at an angle of ninety degrees, said reflectors being symmetrical about the respective axes, the perimeters of said reflectors defining respectively two planes which intersect at right angles, each plane being perpendicular to the axis of the respective reflector, the proximal portions of the two perimeters being contiguous with each other whereby said reflectors are mutually exposed to receive and reflect light from the other toward the area to be illuminated, the profiles of the respective reflectors being such as to illuminate uniformly a plane normal to a line bisecting said angle in an area extending between the points of intersection of this last-mentioned plane by said axes.

References Cited in the file of this patent

UNITED STATES PATENTS

| | | |
|---|---|---|
| 1,159,047 | Kimura | Nov. 2, 1915 |
| 2,547,126 | Kaish et al. | Apr. 3, 1951 |
| 2,560,200 | Werzyn | July 10, 1951 |
| 2,596,376 | De Goeij | May 13, 1952 |
| 2,682,816 | Walden | July 6, 1954 |
| 2,763,772 | Hine | Sept. 18, 1956 |

UNITED STATES PATENT OFFICE
CERTIFICATE OF CORRECTION

Patent No. 3,007,035 October 31, 1961

Kenneth C. De Groff

It is hereby certified that error appears in the above numbered patent requiring correction and that the said Letters Patent should read as corrected below.

Column 4, line 38, after "be" insert -- angled toward each other, the axes of said sockets in- --.

Signed and sealed this 10th day of April 1962.

(SEAL)
Attest:

ERNEST W. SWIDER
Attesting Officer

DAVID L. LADD
Commissioner of Patents